US008301296B2

(12) United States Patent

Grundmann et al.

(10) Patent No.: US 8,301,296 B2

(45) Date of Patent: Oct. 30, 2012

(54) METHOD FOR IDENTIFYING TRANSPORTATION ITEMS, PARTICULARLY LUGGAGE ITEMS

(75) Inventors: Hans-Jörg Grundmann, Zirndorf (DE); Georg Kinnemann, Bestensee (DE)

(73) Assignee: Siemens Aktiengesellschaft, Munich (DE)

( * ) Notice: Subject to any disclaimer, the term of this patent is extended or adjusted under 35 U.S.C. 154(b) by 456 days.

(21) Appl. No.: 12/670,054

(22) PCT Filed: Jul. 4, 2008

(86) PCT No.: PCT/EP2008/058674

§ 371 (c)(1), (2), (4) Date: Jan. 21, 2010

(87) PCT Pub. No.: WO2009/015991

PCT Pub. Date: Feb. 5, 2009

(65) Prior Publication Data

US 2010/0191367 A1 Jul. 29, 2010

(30) Foreign Application Priority Data

Jul. 27, 2007 (DE) ......................... 10 2007 035 272

(51) Int. Cl.
*G06F 7/00* (2006.01)

(52) U.S. Cl. ........ 700/224; 700/226; 700/229; 700/213; 700/225; 700/228

(58) Field of Classification Search ........................ None
See application file for complete search history.

(56) References Cited

U.S. PATENT DOCUMENTS 5,299,116 A 3/1994 Owens et al.
6,580,046 B1 * 6/2003 Koini et al. .................. 209/564
6,662,078 B1 * 12/2003 Hardgrave et al. ........... 700/226
2005/0114690 A1 5/2005 Rodriguez et al.
2006/0220857 A1 * 10/2006 August et al. .............. 340/572.1

FOREIGN PATENT DOCUMENTS

DE 20 2004 008 602 U1 9/2004
EP 1 070 664 A2 1/2001
WO 2008/003609 A1 1/2008

OTHER PUBLICATIONS

International Search Report of PCT/EP2008/058674, dated Dec. 22, 2008.

* cited by examiner

*Primary Examiner* — Gene Crawford
*Assistant Examiner* — Yolanda Jones
(74) *Attorney, Agent, or Firm* — Laurence A. Greenberg; Werner H. Stemer; Ralph E. Locher

(57) ABSTRACT

A method of identifying transportation items which are physically different from one another, particularly for identifying automatically sortable passenger luggage in air, rail, or ocean travel, using electronically readable information associated with the transportation item. To be able to automatically identify transportation items, particularly luggage items, even when information storage media fitted to them cannot be read or can be read only imperfectly, it is proposed that, before or when the transportation item is surrendered to a transport and/or sorting system, special sensors be used to ascertain specific physical features of the respective transportation item and that these specific physical features be stored in a database as an electronic feature data record (signature) together with an identification code associated with the transportation item, the stored feature data records being compared with a subsequently produced feature data record for a transportation item as required, in order to identify the transportation item using its associated identification code when there is at least a sufficient match between the subsequently produced feature data record and one of the feature data records stored in the database.

14 Claims, 2 Drawing Sheets

5 9 10 7 8 12 13 14 4 2 3 15 1 6 1

1
2
3
4
5
6
7
8
9
10
12
13
14
15

10
9
12
4
15
1
14
3
8
7
6
2
13
11
1

METHOD FOR IDENTIFYING TRANSPORTATION ITEMS, PARTICULARLY LUGGAGE ITEMS

BACKGROUND OF THE INVENTION

Field of the Invention

The invention relates to a method for identifying physically differing transportation items, particularly for identifying automatically sortable passenger luggage in air, rail or sea traffic, using electronically readable information associated with the transportation item.

A transportation item is understood within the context of the present invention to mean both the item or the good itself and the packaging holding the item or the container holding the item. Today, such transportation items are routed largely automatically by transportation installations and at the same time sorted in terms of their intended destinations, to which end the individual transportation items are provided with individual, machine-readable information which allows the respective transportation item to be identified within the transportation installation and hence the prerequisite to be provided that the data stored in the computer are used to ascertain the intended destination for the transportation item within the installation.

Typical sorting and transportation installations are luggage sorting installations at airports. There, all luggage items are provided with an information carrier, e.g. what is known as a baggage tag, which, besides the destination airport and the flight number, which are usually printed in plain text, also normally contains an identification code with exactly the same details, which also allow the luggage item to be associated with the air passenger. At present, this identification code is usually a bar code, but it may also be a 2D code or the information on an RFID tag. The information carrier is suitable for and provided for the purpose of identifying the luggage items, which usually differ more or less distinctly in terms of shape, size and other physical features, at downstream reading stations within the airport logistics system in order to route them automatically through the luggage conveyor installation in the desired directions, i.e. to the intended aircraft or to the correct luggage belt.

However, the problem exists that it is not always possible to read all the information carriers or the identification codes thereof and/or some identification codes which have been read in are read only incorrectly. Added to this is the fact that information carriers are lost, for example because they snag in mechanical parts of the luggage conveyor installation and are torn off, which means that the luggage items are no longer identifiable or can now be identified only by means of the information which the customer himself has put on.

Luggage items with information carriers or identification codes which cannot be read automatically are supplied to a manual station, where they are identified by a member of staff, normally using a hand-held scanner or a similar appliance. However, this always means an increased time and cost involvement.

Luggage items which are not picked out and which have an incorrectly read identification code are frequently misdirected. In best case, it remains at the departure airport; in serious cases, the luggage item is transported on an incorrect flight to the wrong airport. Correction of this misdirection means an even greater level of involvement and a high level of annoyance for the affected passengers.

Luggage items whose information carriers have been lost and which are picked out are generally supplied to lost property (Lost & Found), where the passengers can ask for and identify them as soon as the loss has been noticed.

BRIEF SUMMARY OF THE INVENTION

It is an object of the present invention to provide a method for identifying differing transportation items, particularly luggage items at airports, which can be used to automatically identify even transportation items or luggage items which are in the installation without an information carrier or whose available information carrier cannot be read or can be read only incorrectly.

The invention achieves the object by proposing that before or while the transportation item is surrendered to a transportation and/or sorting system, special sensors are used to ascertain specific physical features of the respective transportation item, and said features are stored as an electronic feature data record (signature) together with an identification code associated with the transportation item in a database, wherein the stored feature data records are compared, when required, with a later prepared feature data record for a transportation item so that, if there is an at least adequate match between the later prepared feature data record and one of the feature data records previously stored in the database, the identification code associated with said feature data record can be used to identify the transportation item.

When the transportation item, for example a luggage item, is surrendered, this means that not only is the usual information carrier put on the luggage item, but also special sensors are used to ascertain physical features of the respective transportation item. These specific physical features are sensed electronically and stored in a computer in addition to the available information shown e.g. on information carriers, such as bar codes, RFID tags or 2D codes, so as to be able, in a functional redundancy, to nevertheless associate the luggage item if it is impossible to identify the transportation item using the information carrier which has been put on the transportation item.

It goes without saying that it is also possible to use the method for transportation items which have not been provided with other information carriers from the outset, and the method can be employed wherever transportation items are sorted and transported, such as in warehouses, airports, terminals for cruise ships or other means of transport which transport passengers and luggage.

According to one particular feature of the invention, the specific physical feature sensed by means of sensors and digitized is the texture of the surface of the respective transportation item. By way of example, the surface of the transportation item can be represented in high-resolution images using known video methods, for example, so as to show the surface texture. Image analysis methods can be used to evaluate and determine the surface texture. It is thus also possible to recognize the material of a luggage item from the nature of the surface for example.

In a further refinement of the method according to the invention, the color and/or color distribution on the surface of the transportation item is sensed and added to the feature data record. The sensors for sensing the colors and color distribution may be image sensors, e.g. camera sensors. Together with the texture sensing, just these few data items would allow the provision of a signature for identifying a transportation item, for example a luggage item.

If, in line with the invention, a further specific physical feature sensed is the shape and/or dimensional stability of the transportation item then these features can be used to identify the transportation item for even more certainty. The geometric dimensions of the transportation item can be ascertained from the images from the video cameras using an image processing system, for example.

In accordance with another feature of the invention, it is also a useful option to sense design features of the transportation item, e.g. the type and the arrangement of the handles on a suitcase or of the castors on a trolley.

Finally, a further specific physical feature sensed and stored in the database, including in combination with one or more of the features claimed above, may be the mass of the transportation item, the mass being able to be ascertained using known weighing devices.

These or at least some of these features are used to form the inventive feature data record which is stored, together with the available identification code from the information carrier, as a signature for an individual transportation item in a database which comprises a multiplicity of data pairs comprising an identification code and a signature, each data pair representing one of the transportation items in circulation.

It is known practice to use explicit and permanent identifiers for digital objects, for example for online articles from scientific periodicals, in order to allow access to an identified object or to explicitly denote the objects and messages in the course of standardized interchange of information. Such identifiers could also assist faster identification and allow fast association in the case of the method according to the invention. For this reason, in accordance with one particular feature of the invention, it is proposed that the transportation item be provided with an identifier which is explicit for the transportation item and which represents particular explicit features of the transportation item and contains the relevant data in digitized form. From this identifier, at least some of the desired information about the physical features of the transportation item can be tapped off directly and stored as an electronic feature data record in the computer.

It is advantageous if the identifier from the invention is actually put onto the transportation item by the manufacturer thereof, for example the manufacturer of a luggage item, in a similar manner to the ISBN number in a book or a periodical. Thus, each luggage item (suitcase, bag, trolley) could contain the information about its physical properties in electronic form when it is actually purchased and can thus even allow it to be distinguished from other luggage items outwardly.

However, it is also possible, within the context of the invention, to put the identifier onto the transportation item subsequently in the form of a sticker or tag. An airline customer with an appropriate identifier on his luggage, for example, would in this way always be provided with greater certainty that his luggage will arrive punctually and not be lost.

In line with the invention, the information in the identifier may be in the form of a bar code or 2D code, but may also be depicted on an RFID tag which contains all or some of the features described above as a feature data record, what is known as the signature.

In practice, the transportation item passes through the transportation installation, for example as a luggage item in an airport logistics system, and needs to be recognized at various stations therein in order to be able to trigger the correct actions (filter settings) in the conveyor system. For this purpose, particular stations are fitted with numerous sensors which first of all attempt to read the identification code on the information carrier. If the identification code can be read reliably, the actions required for this transportation item can be prompted without further measures.

Should it not be possible to read the identification code, for example because an information carrier is missing, concealed, damaged or soiled, the method according to the invention is used to determine the physical features of this transportation item using appropriate sensors or by reading the identifier and to combine them to form a feature data record (signature) which is typical of this transportation item. This feature data record is used to look for matches in the database, which stores all feature data records for all luggage items. The stored feature data record which has the greatest similarity to the requested feature data record then has a high level of probability of being the one which belongs to the luggage item that is being examined. The associated identification code (including destination airport and flight number) can then be taken from the database and the actions which are necessary for this transportation item can be initiated.

The inventive solution described allows the recognition rate for luggage items in the luggage conveyor system at an airport to be significantly increased and the error rate to be significantly reduced, for example. This eliminates the additional manual identification involvement for a large number of unrecognized luggage items. Furthermore, it is also possible to identify and locate luggage items for which the information carrier has been lost, which means that the airport can be relieved of the burden of replacing and searching for lost luggage items. The system described can thus be used to attain significantly better financial results. The evaded annoyance of the passengers about misdirected and lost luggage results in a high level of customer satisfaction and acceptance.

A further advantage which can be attained by means of the method according to the invention is that it is possible to check, before aircraft are loaded, whether an information carrier which has been put on the luggage item actually matches the captured feature data record. This allows particularly endangered airlines or endangered flights to be protected from manipulation of luggage within the airport for the purpose of jeopardizing flights.

An exemplary embodiment of the invention is illustrated in the drawing and is described below.

In the drawing:

DESCRIPTION OF THE INVENTION

Figure 1:
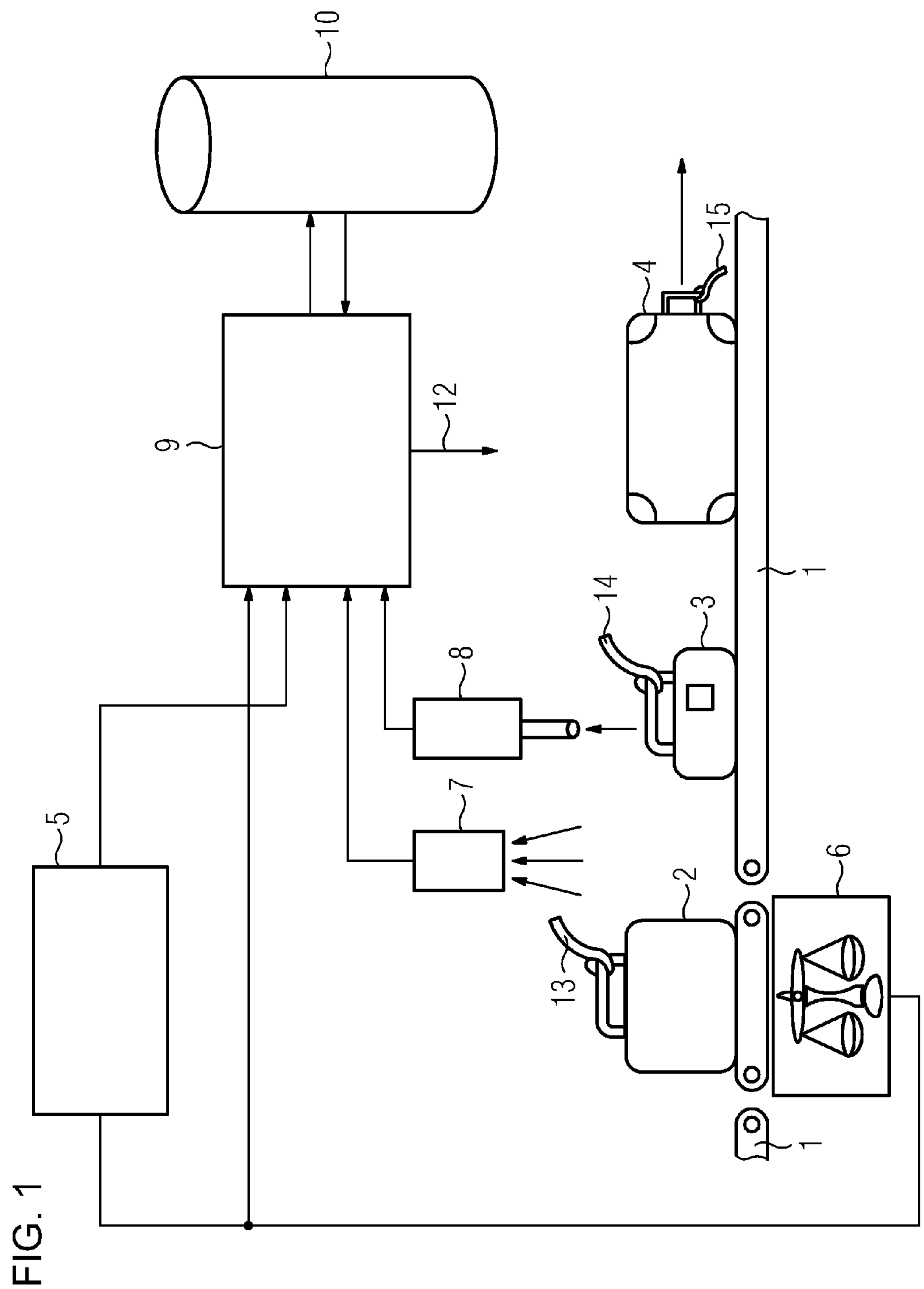
FIG. 1 shows the block diagram of an airport check-in system according to the invention.

FIG. 1 shows a highly schematic illustration of an inventive check-in system using the example of an airport. The conveyor belt 1 holds the luggage items 2, 3 and 4. The check-in station 5 receives details about the weight of the respective luggage item 2, 3 or 4 from the weighing system 6 and generates the identification code, which, together with the respective sensed weight, is sent to the control computer 9. The 3D sensor 7 ascertains the geometric dimensions of each luggage item 2, 3 or 4 and supplies the individual parameters likewise to the control computer 9. In addition, one or more cameras 8 produce(s) images of each luggage item 2, 3, or 4, which are also forwarded to the control computer 9. It is also possible to use cameras which sense the texture of the surface of the luggage item, this being evaluated later in the control computer 9.

Finally, the control computer 9 takes the transmitted data for each luggage item (takes the texture) and ascertains the material, the geometric shape and the dimensional stability, design features, if available the luggage item identifier, the color of the luggage item 2, 3 or 4 and the color distribution on the luggage surface and also the mass of each luggage item and combines all of this information about each luggage item to form a feature data record which, together with the identification code printed on the information carrier 13, 14, 16, is sent to the database 10.

Figure 2:
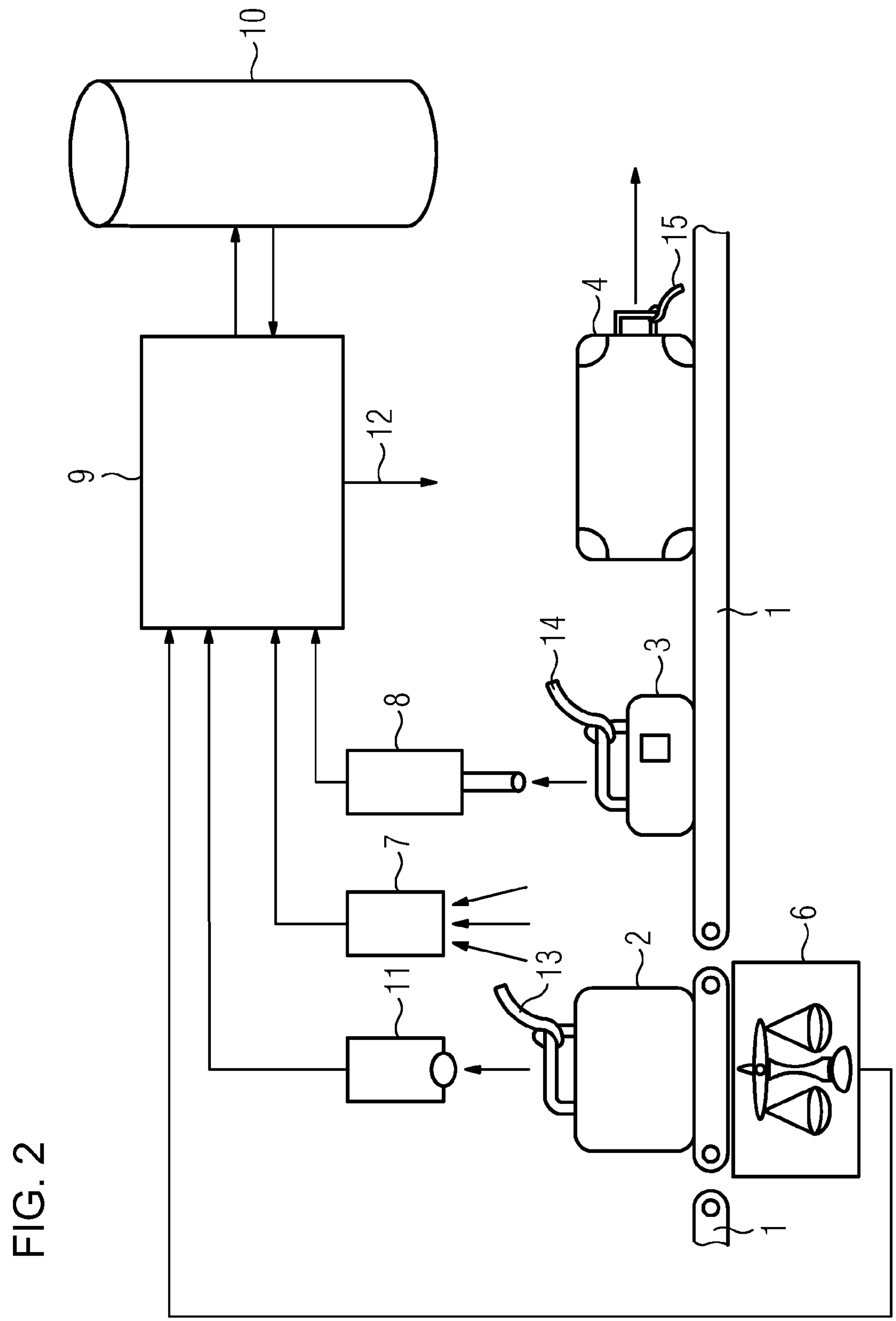
FIG. 2 shows the block diagram of a station for identifying the luggage items.

FIG. 2 shows the block diagram of a station in which luggage items which cannot be identified conventionally can be identified. First of all, one or more bar code readers 11 is/are used to attempt to read the identification code of each luggage item on the information carriers 13, 14 and 15. If this is successful with an adequate level of certainty, the identification is complete. If there is uncertainty in the determination of the identification code or if it is not possible to read a code at all, the scales 6, the 3D sensor 7 and the camera 8 are used to ascertain a complete feature data record in the same way as is shown in FIG. 1 and described therefor, and the control computer 9 sends it as a query to the database 10. The database 10 compares the supplied feature data record with the previously stored feature data records and, if there is a match with one of said feature data records, returns the associated identification code thereof. The control computer 9 is then able to send the necessary control signals 12 to the transportation system, for example for the purpose of filter adjustment.

The invention claimed is:

1. A method for transporting and sorting physically different transportation items, which comprises:

ascertaining, with one or more sensors, automatically readable information associated with each transportation item as specific physical features of the respective transportation item before or while the transportation item is surrendered to a transportation and/or sorting system;

storing the automatically readable information as an electronic feature data record (signature) together with an identification code associated with said transportation item in a database;

handling the transportation item in accordance with the respective identification code;

if it is impossible to identify a given transportation item using the electronically readable identification code:

preparing a further feature data record for the given transportation item and comparing with the feature data records stored in the database;

if an at least adequate match is found between the further feature data record and one of the feature data records previously stored in the database, identifying, sorting, and transporting the transportation item using the identification code associated with the previously stored feature data record and the information contained in the identification code.

2. The method according to claim 1, which comprises acquiring, as one specific physical feature sensed by way of a sensor, a texture of a surface of the respective transportation item.

3. The method according to claim 1, which comprises sensing a color and/or color distribution on a surface of the transportation item and adding same to the feature data record.

4. The method according to claim 1, wherein a specific physical feature is a shape and/or dimensional stability of the transportation item.

5. The method according to claim 1, which comprises sensing one or more design features of the transportation item.

6. The method according to claim 1, which comprises sensing and storing in the database at least one of the specific physical features selected from the group consisting of a depiction, a geometric dimension, and a mass of the transportation item.

7. The method according to claim 1, wherein the transportation item is an item of automatically sortable passenger luggage in air, rail, or ocean travel.

8. The method according to claim 1, which comprises assigning to the transportation item an identifier which is unique with regard to physical features of the transportation item.

9. The method according to claim 8, wherein the identifier is an identifier previously placed on the transportation item by a manufacturer thereof.

10. The method according to claim 8, wherein the transportation item is a piece of luggage.

11. The method according to claim 8, wherein the identifier is present on a sticker affixed to the transportation item.

12. The method according to claim 8, wherein the identifier is present on a tag affixed to the transportation item.

13. The method according to claim 8, wherein the identifier is a bar code or a 2D code.

14. The method according to claim 8, wherein the identifier is in the form of an RFID tag.

* * * * *